United States Patent

Mangili et al.

[11] Patent Number: 5,898,157
[45] Date of Patent: Apr. 27, 1999

[54] AUTOMATIC CHECK READING DEVICE

[75] Inventors: Fulvia Mangili, Finale Ligure; Pier Luigi Croce, Genoa; PierCarlo Ravasio, Calco, all of Italy

[73] Assignee: Finmeccanica S.p.A., Italy

[21] Appl. No.: 08/807,248

[22] Filed: Feb. 28, 1997

[30] Foreign Application Priority Data

Mar. 1, 1996 [IT] Italy ................................. TO96A0154

[51] Int. Cl.$^6$ ................................. G06K 5/00; G06K 7/08
[52] U.S. Cl. ........................................... 235/380; 235/449
[58] Field of Search .................................... 235/380, 449

[56] References Cited

U.S. PATENT DOCUMENTS

| | | | |
|---|---|---|---|
| 4,813,077 | 3/1989 | Woods et al. | 382/7 |
| 5,040,226 | 8/1991 | Elischer et al. | 382/7 |
| 5,193,121 | 3/1993 | Elischer et al. | 382/7 |
| 5,438,186 | 8/1995 | Nair et al. | 235/449 |
| 5,544,043 | 8/1996 | Miki et al. | 364/406 |
| 5,673,320 | 9/1997 | Ray et al. | 380/25 |
| 5,679,940 | 10/1997 | Templeton et al. | 235/380 |
| 5,781,654 | 7/1998 | Carney | 382/137 |

FOREIGN PATENT DOCUMENTS

| | | |
|---|---|---|
| 0115189 | 9/1984 | European Pat. Off. . |
| 0344742 | 12/1989 | European Pat. Off. . |
| 0446634 | 9/1991 | European Pat. Off. . |

Primary Examiner—Anita Pellman Gross
Assistant Examiner—Daniel H. Sherr
Attorney, Agent, or Firm—Palmatier, Sjoquist, Voigt & Christensen, P.A.

[57] ABSTRACT

A device for automatically reading checks, wherein a scanner includes a reading unit for reading an identification code on the check, and a reading unit for taking an image of the surface of the check, and the device also includes a central processing unit receiving the digitized image of the check, and for defining an the image, on the basis of the identification code, at least two subimages respectively containing the numeric amount and the alphabetic amount of the check. The device also provides for binary-coding the subimages to automatically read the numeric and alphabetic amounts in the binary-coded subimages, and for correlating the two amounts to elect a final amount, which is displayed on a video of the processing unit together with the image of the check.

9 Claims, 4 Drawing Sheets

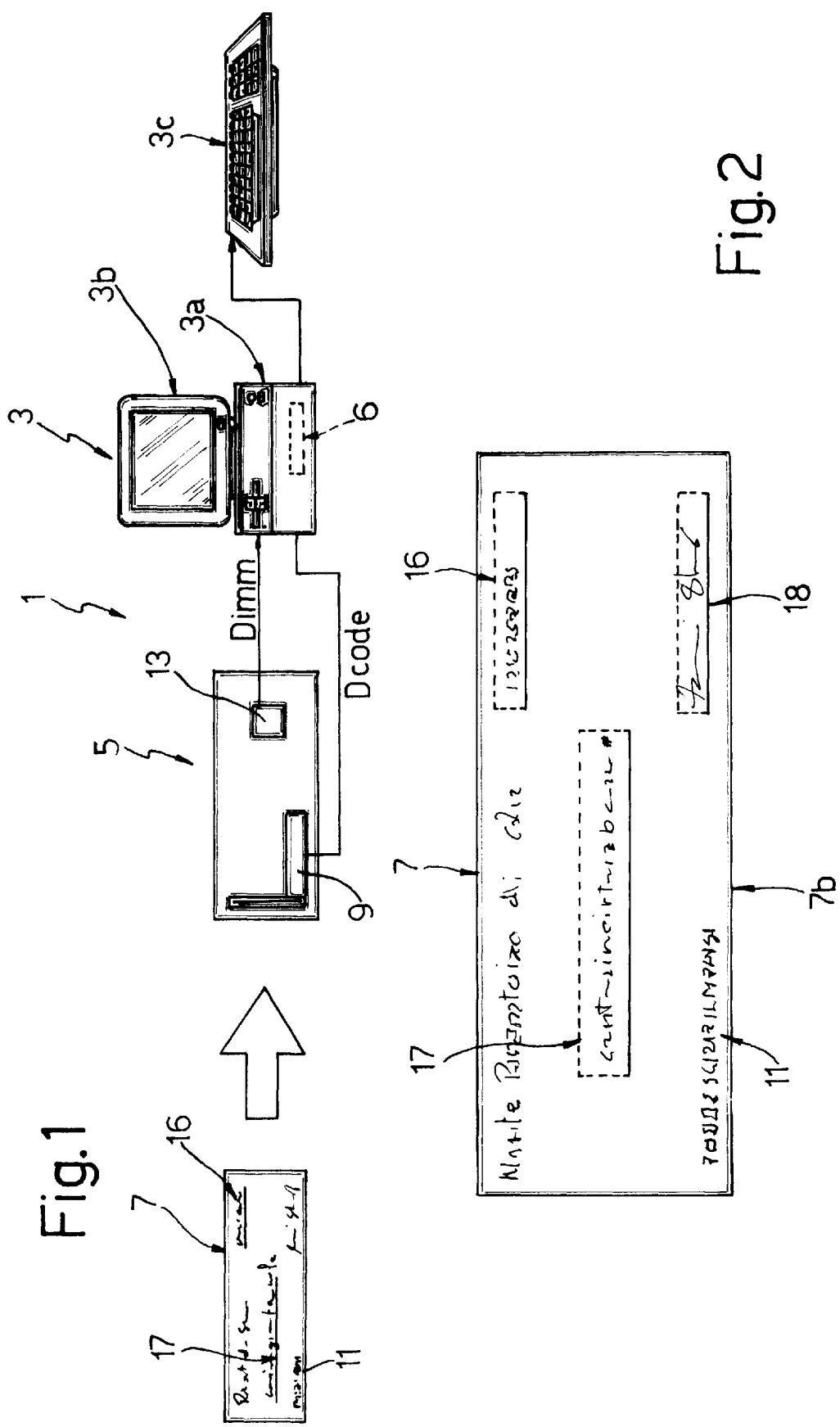

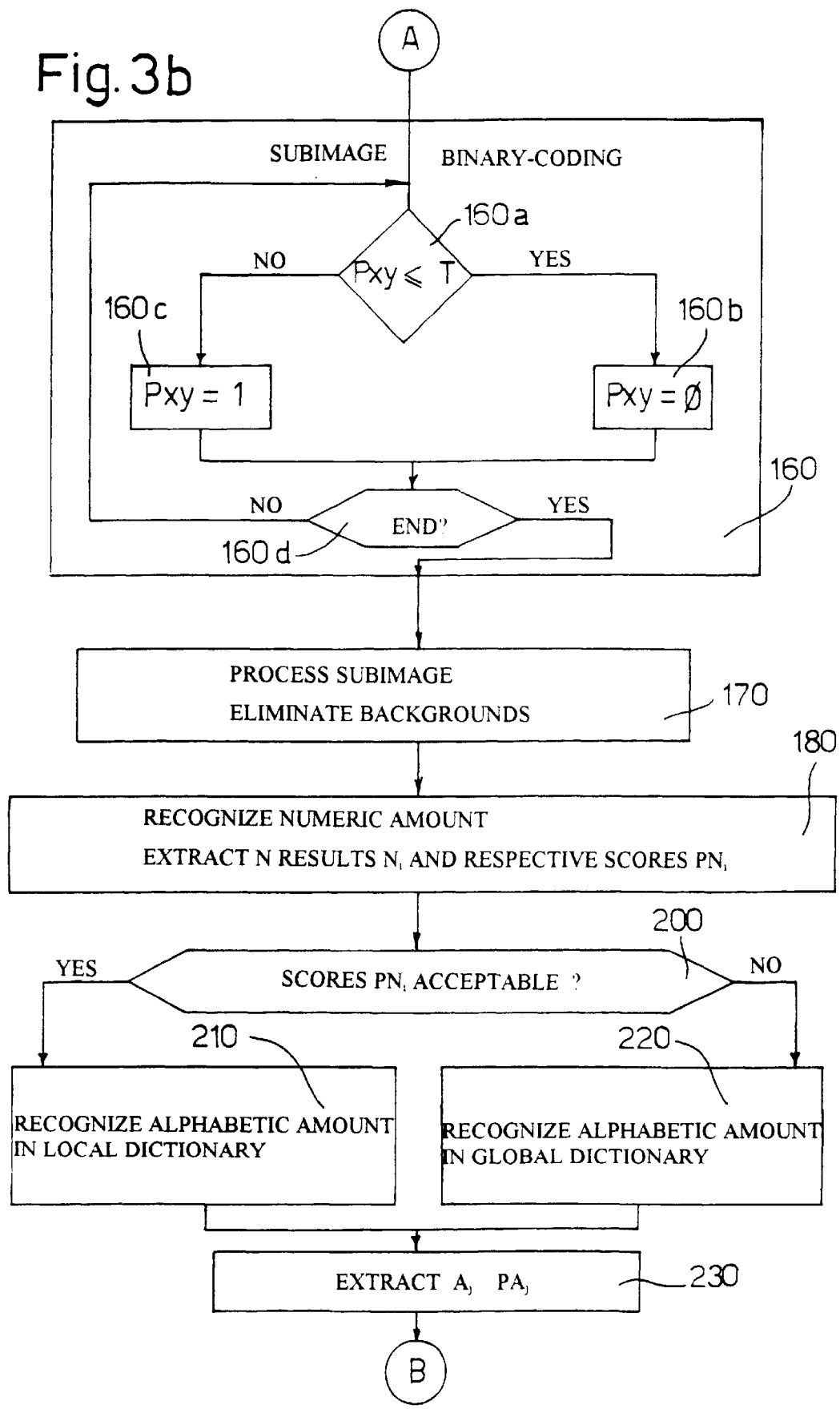

AUTOMATIC CHECK READING DEVICE

BACKGROUND OF THE INVENTION

The present invention relates to an automatic check reading device.

As is known, checks (bank checks, banker's drafts, etc.) comprise a rectangular form bearing various printed data (name of the issuing bank, serial number, etc.) and a number of separate blank spaces to be filled in by the user, and which comprise a first space numeric field) in which to indicate the numeric amount of the check, a second space (alphabetic field) in which to indicate the alphabetic amount of the check, both of which entries may be handwritten or typed, and a third space (signature field) for the user's signature. Along the bottom edge, Italian checks at present also comprise an identification code in magnetic ink (CMC7 code) containing data relative to the check number, the bank identification (ABI) code, and the issuing branch identification (CAB) code, and which is readable automatically and magnetically by a read unit, which supplies the coded data to a central, e.g. bank, processing unit.

Known reading systems are capable of automatically reading the identification code, but not the alphabetic amount written by the user.

SUMMARY OF THE INVENTION

It is an object of the present invention to provide a system for automatically reading the alphabetic and numeric amounts using the information contained in the identification code.

According to the present invention, there is provided a device for automatically reading checks, as claimed in claim 1.

BRIEF DESCRIPTION OF THE DRAWINGS

A non-limiting embodiment of the present invention will be described by way of example with reference to the accompanying drawings, in which:

FIG. 1 shows a schematic view of an automatic check reading device in accordance with the teachings of the present invention;

FIG. 2 shows a check;

FIGS. 3a, 3b and 3c show an operating block diagram of the FIG. 1 device.

DETAILED DESCRIPTION OF THE INVENTION

Figure 3A:
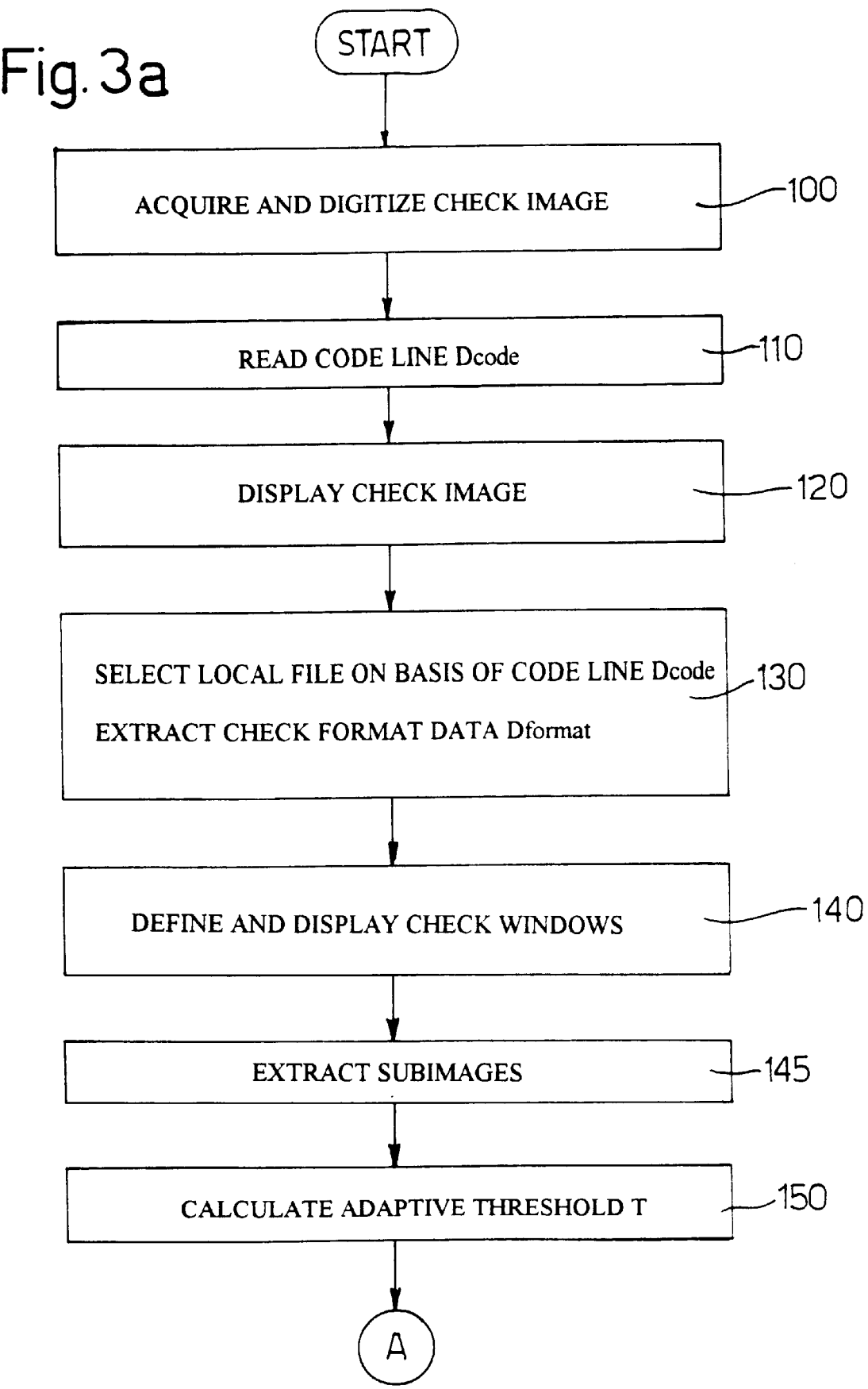

Number 1 in FIG. 1 indicates an automatic check reading device comprising a processing unit 3—conveniently a personal computer—and a scanner 5 cooperating with personal computer 3. Personal computer 3 comprises a central unit 3a, a video terminal 3b and an alphanumeric keyboard 3c; and central unit 3a comprises at least one mass memory 6 (conveniently a hard disk) for storing data used for the operation of device 1.

Scanner 5 provides for scanning checks 7, and comprises a first magnetic read unit 9, and a second read unit 13 for taking an image of the surface of the check. As is known (FIG. 2), each check is substantially rectangular, and comprises, at the longer bottom edge 7b, an identification code (CODE LINE) 11, e.g. in magnetic ink (CMC7 code), which is read by unit 9, which in turn supplies personal computer 3 with data identifying the check (more specifically, the CODE LINE data indicates the check number, the bank, and the branch by which the check was issued).

Each check 7 also comprises a first portion 16 (numeric field) in which to indicate the numeric amount of the check, a second portion 17 (alphabetic field) in which to indicate the alphabetic amount of the check, both of which entries may be handwritten or typed, and a third portion 18 (signature field) for the user's signature.

Figure 3C:
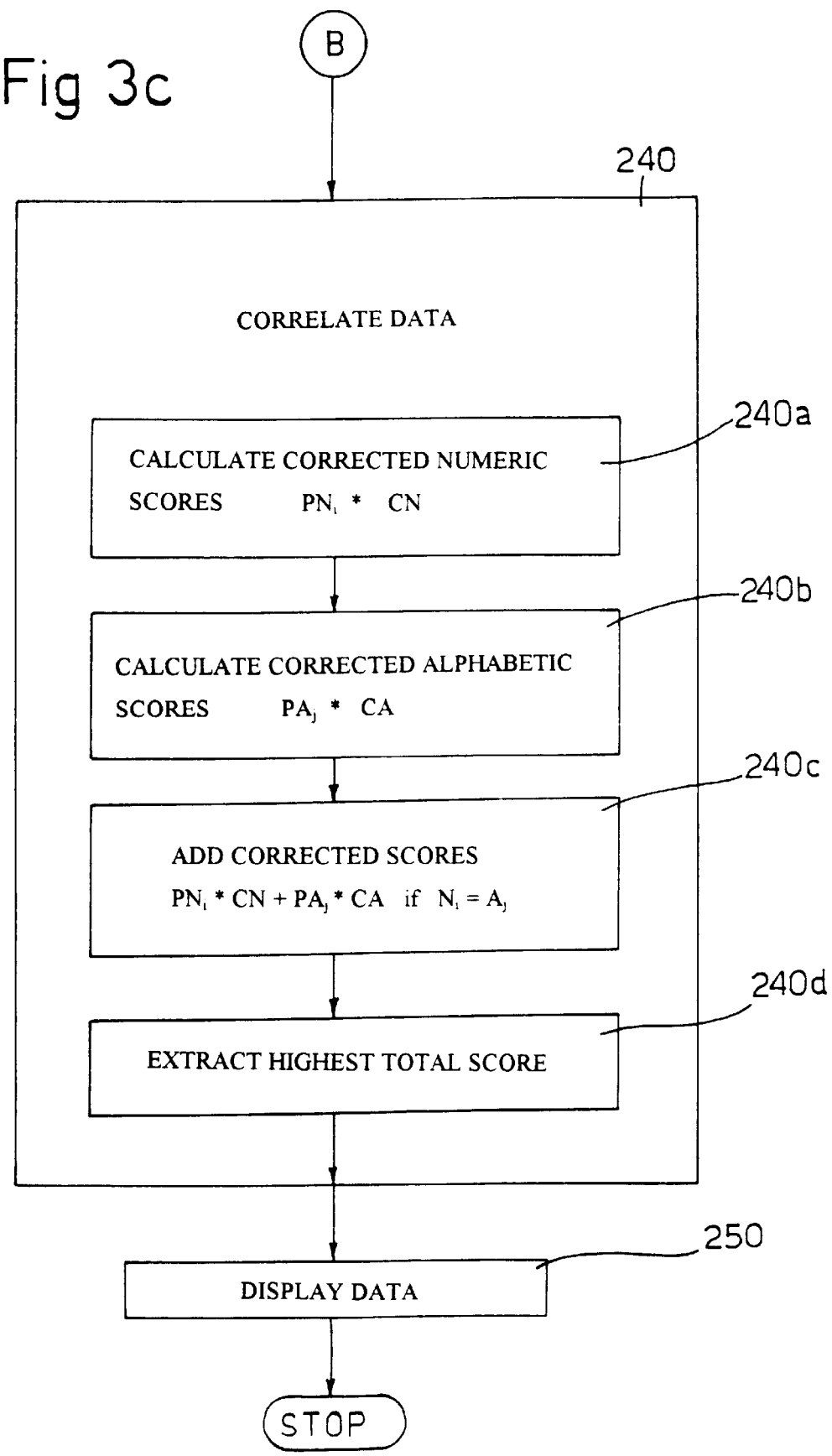

The operations performed by device 1 will now be described with reference to FIG. 3.

To begin with, in a block 100, the image of check 7 is acquired and digitized by read unit 13. That is, the image of the check is converted into a rectangular matrix of dots $P_{x,y}$, each of a grey level Ig defined by a whole number (e.g. from 0 to 255 in the case of eight-bit digitization).

Following (or parallel with) the image acquisition operation, unit 9 reads identification code (CODE LINE) 11 of the check (block 110 following block 100).

The $D_{code}$ data relative to the read identification code (CODE LINE) is transmitted to central processing unit 3 together with the set of data $D_{imm}$ representing the digital image of the check.

Block 110 is followed by a block 120, which provides for displaying the image of the check on video terminal 3b. Conveniently, block 120 provides for displaying an enlarged, grey-level image of check 7.

Block 120 is followed by a block 130, which, on the basis of the $D_{code}$ data in the identification code, selects a local file in memory 6; the local file supplies the name of the bank issuing the check (BANK NAME) and possibly also data relative to the branch (BRANCH NUMBER AND NAME) handling the checking account on which the check is drawn. The bank name and branch data may be displayed on video 3b.

On the basis of the $D_{code}$ input data, the local file also supplies various check format data $D_{format}$ defining the physical size of the check, the size of some of the user-compilable fields on the check (numeric field, alphabetic field, signature field), and the location of these fields within the perimeter of the check. As is known, each bank employs a given check format with first, second and third fields of a predetermined size and a predetermined location on the check.

Block 130 is followed by a block 140, which, in accordance with the $D_{format}$ data, defines on the check image three windows F1, F2, F3, each defining a respective portion of the image.

More specifically, block 140 defines a first rectangular window F1 defining the image portion containing the numeric amount (numeric field) of the check; a second rectangular window F2 defining the image portion containing the alphabetic amount (alphabetic field) of the check; and a third rectangular window F3 defining the image portion containing the signature.

Block 140 also provides for superimposing on the image displayed on video 3b a graphic representation of defined windows F1, F2, F3, each of which may be defined graphically on the image by a brightly coloured rectangular frame superimposed on the image (generally monochromatic) of the check.

Block 140 is followed by a block 145, which extracts from the image of the check two subimages comprising the dots in windows F1 and F2 respectively.

Block 145 is followed by a block 150, which (in known manner) calculates an adaptive threshold T (background image) for binary-coding the image of the check.

Each subimage F1, F2 is then binary-coded (block 160 following block 150) to generate respective binary subimages $I_{num}$ and $I_{alph}$ respectively containing the numeric and alphabetic information relative to the amount of the check.

Block 160 is followed by a block 170 for graphically processing binary subimages $I_{num}$ and $I_{alpha}$. More specifically, by means of known (background elimination) algorithms, block 170 extracts and eliminates from binary subimages $I_{num}$ and $I_{alph}$ any parts corresponding to background elements of the check, such as straight-line segments corresponding to printed line portions along which to write the amounts of the check.

Block 170 is followed by a block 180, which is supplied with the digitized subimage $I_{num}$ comprising the image of the numeric amount "cleaned" in block 170. Subimage $I_{num}$ is processed by means of a known numeric recognition algorithm, which supplies a set of N numeric results $N_i$ (i-th numeric amount recognized), each of which is assigned a respective score $PN_i$ indicating the quality and reliability of the numeric recognition process. That is, the score value is directly proportional to the confidence level at which numeric amount $N_i$ has been recognized.

Block 180 is followed by a block 200, which examines all N calculated scores $PN_i$. In the event the highest of the calculated scores $PN_i$ is below a predetermined threshold value, or scores $PN_i$ are very close together (ambiguous recognition), block 200 goes on to block 220. Conversely, block 200 goes on to block 210.

Block 220 receives the digitized, "cleaned" subimage $I_{alph}$ containing the image of the alphabetic amount of the check. Subimage $I_{alph}$ is processed by means of a known alphabetic recognition algorithm, which supplies M numeric results $A_j$, each of which is assigned a respective score $PA_j$ indicating the quality and reliability of the alphabetic recognition process. That is, the score value is directly proportional to the confidence level at which the alphabetic amount has been recognized.

The recognition operations in block 220 are performed by an algorithm on the basis of a static dictionary compiled beforehand and containing words corresponding to all the numeric amounts which might possibly be expected to be written on the check (GLOBAL DICTIONARY).

Block 210 receives the digitized subimage $I_{alph}$ containing information relative to the alphabetic amount of the check. Subimage $I_{alph}$ is processed using the same alphabetic recognition algorithm as in block 220, but with reference to a smaller dictionary (LOCAL DICTIONARY) compiled dynamically on the basis of the N recognition hypotheses in block 180, and therefore containing alphabetic amounts corresponding to numeric results of recognized and acceptable amounts. Blocks 220 and 210 are followed by a block 230, which examines the alphabetic results $A_j$ and respective scores $PA_j$ calculated in blocks 210 and 220, and converts the alphabetic results $A_j$ into numeric data.

Block 230 is followed by a block 240, which correlates the calculated numeric results $N_i$ and alphabetic results $A_j$. More specifically, block 240 receives N numeric results $N_i$ (each assigned a respective score $PN_i$) and M alphabetic results $A_j$ (each assigned a respective score $PA_j$) and elects a final result Ne.

The final result Ne is extracted by a series of consecutive blocks comprising:

a block 240a, in which each numeric score $PN_i$ is multiplied by a heuristic constant CN (defining numeric recognition quality) to give N corrected numeric scores $PN_i*CN$;

a block 240b, in which each alphabetic score $PA_j$ is multiplied by a heuristic constant CA (defining alphabetic recognition quality) to give M corrected alphabetic scores $AN_j*CA$;

a block 240c, which adds the numeric and alphabetic amount scores of numeric amounts $N_i$ corresponding with alphabetic amounts $A_j$, i.c. performs the operation $PN_i* CN+PA_j* CA$ if $N_i=A_j$. If no numeric amounts $N_i$ correspond with alphabetic amounts $A_j$, the result with the highest absolute score is extracted;

a block 240d, which extracts the amount value with the maximum total score. The value extracted in block 240d is elected as the recognized amount Ne of the check.

Block 240 is followed by a block 250, which displays on video 3b, in the form of a number, the elected numeric/alphabetic result Ne of the check being scanned, the numeric result with the highest confidence level, and the alphabetic result with the highest confidence level.

A more detailed description will now be given of block 160. Block 160 comprises a block 160a, which examines a first dot P of the digitized subimage. If the grey level Ig of dot P is below threshold T, block 160a goes on to block 160b, in which dot $P_{x,y}$ equals logic "zero" ($P_{x,y}=0$). Conversely, block 160a goes on to block 160c, in which dot $P_{x,y}$ equals logic "one" ($P_{x,y}=1$).

Blocks 160b and 160c are followed by block 160d, which determines whether examination of the dots in the subimage has been completed. If it has, block 160d goes on to block 170. If it has not, block 160d goes back to block 160a. This process represents elimination of the theoretical background image from the real image.

The device described therefore provides for reading the amount of the check fully automatically; which reading is performed by "focusing" the recognition process (on the basis of the data detected in the identification code) on the most pertinent portions of the check, i.e. the portions corresponding to the numeric and alphabetic fields. The numeric and alphabetic recognition process (blocks 180, 200, 210, 220) and subsequent correlation of the results (block 240) provide for improving the reliability of the amount recognition process; and the alphanumeric results supplied by device 1 are highly reliable and achieved by rapid processing.

Moreover, the adaptive threshold calculation provides for effective binary-coding of the amounts entered on the check; which binary-coding process is made substantially independent of the background colour or design of the check.

Clearly, changes may be made to the device as described and illustrated herein without, however, departing from the scope of the present invention. In particular, device 1 may be used to advantage for analyzing other banking/accounting documents having an identification code and at least two fields respectively indicating a numeric and an alphabetic amount for automatic recognition.

We claim:

1. A device for automatically reading checks, characterized by comprising:

a central processing unit (3);

scanning means (5) associated with said central processing unit (3) and for scanning checks (7);

said scanning means (5) comprising first reading means (9) for reading an identification code (11) of said check (7) and for supplying the central processing unit (3) with data ($D_{code}$) associated with the identification code (11); said scanning means (5) also comprising second reading means (13) for taking an image of at least part of said check (7) and for supplying said image to the central processing unit (3);

said central processing unit (3) comprising:

search means (130) for selecting local file means (6) on the basis of the data ($D_{code}$) associated with the identification code; said local file means (6) supplying a number of check format data ($D_{format}$) on the basis of the input data ($D_{code}$); said format data ($D_{format}$) defining at least the dimensions and locations, within the check, of a numeric field (16) containing the numeric amount entered on said check, and of an alphabetic field (17) containing the alphabetic amount entered on the check;

selecting means (140, 145) defining, on the image of the check and on the basis of the supplied format data ($D_{format}$), at least a first subimage ($I_{num}$) corresponding to the numeric field (16), and a second subimage ($I_{alf}$) corresponding to the alphabetic field (17);

automatic numeric reading means (180) receiving said first subimage ($I_{num}$) and generating at least one associated numeric amount ($N_i$);

automatic alphabetic reading means (210, 220) receiving said second subimage ($I_{num}$) and generating at least one associated alphabetic amount ($A_j$);

correlating means (240) for correlating said numeric amount ($N_i$) with said alphabetic amount ($A_j$) to elect a final amount (Ne) of said check.

2. A device as claimed in claim 1, characterized in that said automatic numeric reading means (180) generate a first number (N) of recognized numeric amounts ($N_i$), each of which is assigned a respective score ($PN_i$) indicating the quality and reliability of the numeric recognition process performed;

said automatic alphabetic reading means (210, 220) generating a second number (M) of recognized alphabetic amounts ($A_j$), each of which is assigned a respective score ($PA_j$) indicating the quality and reliability of the alphabetic recognition process performed;

and said correlating means (240) correlating said recognized numeric amounts ($N_i$) and respective scores ($PN_i$) with said recognized alphabetic amounts ($A_j$) and respective scores ($PA_j$) to elect a final amount (Ne) of said check.

3. A device as claimed in claim 2, characterized in that said automatic numeric reading means (180) select score comparing means (200) for examining the calculated scores ($PN_i$) of said numeric amounts ($N_i$);

said score comparing means (200) selecting first automatic alphabetic reading means (220) in the event the highest calculated score ($PN_i$) is below a reference value, and said score comparing means (200) selecting second automatic alphabetic reading means (210) in the event said highest score ($PN_i$) is above the reference value;

said first automatic alphabetic reading means (220) recognizing said alphabetic amount via an algorithm operating on the basis of a dictionary compiled beforehand and containing words corresponding to possible numeric amounts; and said second automatic alphabetic reading means (210) recognizing said alphabetic amount with reference to a smaller dictionary compiled dynamically on the basis of the recognition hypotheses of said automatic numeric reading means (180), and containing alphabetic amounts corresponding to acceptable recognized numeric amounts.

4. A device as claimed in claim 2, characterized in that said automatic numeric reading means (180) select score comparing means (200) for examining the calculated scores ($PN_i$) of said numeric amounts ($N_i$);

said score comparing means (200) selecting first automatic alphabetic reading means (220) in the event said scores ($PN_i$) are very close together, and said score comparing means (200) selecting second automatic alphabetic reading means (210) in the event said scores ($PN_i$) are well separated;

said first automatic alphabetic reading means (220) recognizing said alphabetic amount via an algorithm operating on the basis of a dictionary compiled beforehand and containing words corresponding to possible numeric amounts; and said second automatic alphabetic reading means (210) recognizing said alphabetic amount with reference to a dictionary compiled dynamically on the basis of the recognition hypotheses of said automatic numeric reading means (180), and containing alphabetic amounts corresponding to acceptable recognized numeric amounts.

5. A device as claimed in claim 2, characterized in that said correlating means (240) comprise:

first calculating means (240a) wherein each numeric score ($PN_i$) is multiplied by a heuristic constant (CN) defining numeric recognition quality, to give a first number (N) of corrected numeric scores ($PN_i*CN$);

second calculating means (240b) wherein each alphabetic score ($PA_j$) is multiplied by a heuristic constant (CA) defining alphabetic recognition quality, to give a second number (M) of corrected alphabetic scores ($AN_j*CA$);

third calculating means (240c) for adding ($PN_1*CN+PA_j*CA$) the corrected numeric scores and the corrected alphabetic scores of the numeric amounts ($N_i$) corresponding ($N_i=A_j$) with the alphabetic amounts ($A_j$), to give total scores; and fourth calculating means (240d) for extracting the numeric and alphabetic value associated with the maximum total score; said extracted value forming said final amount (Ne).

6. A device as claimed in claim 5, characterized in that said third calculating means (240c) extract the result with the highest absolute score in the event no numeric amounts ($N_i$) are found to correspond ($N_i=A_j$) with the alphabetic amounts ($A_j$).

7. A device as claimed in claim 1, characterized by comprising binary-coding means (160) for binary-coding said first and second subimage to generate a respective first and second binary subimage ($I_{num}$ and $I_{alph}$) which are supplied repetitively to said automatic numeric reading means (180) and to said automatic alphabetic reading means (210, 220).

8. A device as claimed in claim 7, characterized in that said binary-coding means (160) comprise:

adaptive threshold calculating means (160) for calculating at least one binary-coding threshold value; and comparing means (160a, 160b, 160c) for examining the dots ($P_{x,y}$) of the subimages; said comparing means (160a, 160b, 160c) assuming equal to a first binary value ("zero") the examined dots ($P_{x,y}$) of a grey level below or equal to the binary-coding threshold, and assuming equal to a second binary value ("one") the other examined dots ($P_{x,y}$).

9. A device as claimed in claim 1, characterized by comprising means (170) for graphically processing said subimages ($I_{num}$ and $I_{alph}$) and for extracting and eliminating from the subimages ($I_{num}$ and $I_{alph}$) definite geometric forms corresponding to background elements of the check.

* * * * *

UNITED STATES PATENT AND TRADEMARK OFFICE
CERTIFICATE OF CORRECTION

PATENT NO. : 5,898,157
DATED : Apr. 27, 1999
INVENTOR(S) : Fulvia Mangili, Pier Luigi Croce, PierCarlo Ravasio It is certified that error appears in the above-indentified patent and that said Letters Patent is hereby corrected as shown below:

Abstract, line 6: please delete the word "an" and in its place insert --on--

Col. 3, line 17: please add a space after "$PN_i$"

Col. 4, line 17: please delete "P" and insert in its place --$P_{x,y}$--

Col. 4, line 18: please delete "P" and insert in its place --$P_{x,y}$--

Signed and Sealed this

Twelfth Day of September, 2000

Attest:

Q. TODD DICKINSON

*Attesting Officer*      *Director of Patents and Trademarks*